United States Patent

[11] 3,631,345

[72] Inventor Keith H. Wycoff
P.O. Box 308, Lexington, Nebr. 68850

[21] Appl. No. 871,101
[22] Filed Oct. 7, 1969
[45] Patented Dec. 28, 1971
Original application Mar. 9, 1964, Ser. No. 350,163. Divided and this application Oct. 7, 1969, Ser. No. 871,101

[54] MONITOR CIRCUIT
4 Claims, 3 Drawing Figs.

[52] U.S. Cl. .................... 325/364, 325/31, 325/64, 340/171
[51] Int. Cl. .................... H04b 1/00
[50] Field of Search .................... 325/31, 64, 364, 455, 466; 340/155, 156, 164, 253, 252, 171; 343/225, 228

[56] References Cited
UNITED STATES PATENTS 3,365,669 1/1968 Funaki et al. .................... 325/364 X

*Primary Examiner*—Robert L. Griffin
*Assistant Examiner*—R. S. Bell
*Attorney*—Prangley, Clayton, Mullin & Vogel

ABSTRACT: The present invention is directed to a monitor circuit for use in a communication receiver including an input circuit and a detecting circuit having applied thereto a carrier signal carrying intelligence from a transmitter, the monitor circuit comprising a monitor input circuit having the input thereof coupled to the detecting circuit and an output, the monitor input circuit being responsive to the application of the carrier signal to the receiver for providing a control signal on the output thereof, a monitor switch connected to the output of the monitor input circuit and having a first inoperative condition and a second operative condition, and a monitor indicator coupled to the monitor switch, the monitor switch being responsive to the application thereto of the control signal for actuating the monitor switch from the first inoperative position thereof to the second operative position thereof to operate the monitor indicator.

INVENTOR
KEITH H. WYCOFF

Prangley, Clayton, Mullin, Dithmar & Vogel
ATTYS.

MONITOR CIRCUIT

This application is a division of the copending application of Keith H. Wycoff, Ser. No. 350,163, filed Mar. 9, 1964, for Selective Calling Communication System and Components Thereof.

The present invention relates to communication systems, and particularly to communication systems for selectively transmitting intelligence from a transmitter to at least one selected receiver.

The principles of the present invention are equally applicable to communication systems utilizing transmission by wire lines, transmission by a modulated supersonic signal, transmission by AM radio and transmission by FM radio. However, certain features of the invention are most useful when applied to communication systems utilizing FM radio transmission, and accordingly, for the purposes of illustration the invention will be illustrated as applied to FM radio communication systems, and particularly to mobile FM radio communication systems.

There have been several systems utilized heretofore for selectively calling one or more receivers in a mobile FM radio system, all of which prior systems have exhibited substantial disadvantages in use. One such prior system utilizes a "subaudible" tone superimposed upon the normal voice modulation, the tone being present during the entire transmission; i.e., the presence of the subaudible tone maintains the associated receiver being called in the receiving condition, loss of the subaudible tone causing the receiver to be placed in a nonreceiving condition. Such a system presents serious problems due to the difficulty of modulating an FM radio signal at low frequencies. Special filtering is required at the receiver to remove the subaudible tone from the speech so that it will not interfere therewith, low-frequency filters suitable for such service being bulky and expensive. Nonusers of the equipment operating on the same channel are inconvenienced in that they must listen to an objectionable rumble in their receiver every time a transmission is made by a user of the subaudible tone control system.

Another prior tone control system used heretofore in mobile FM radio communication systems utilized an audible tone of higher frequency to alert the intended receiver. Reception of the tone by the intended receiver may, for example, actuate a light, thus signalling the user to manually turn on the receiver. Alternatively, the tone of higher frequency may be applied through the receiver output automatically to actuate the receiver into a receiving condition. This system has certain undesirable features including a substantial time delay which must be waited out while the control tone or tones are being transmitted, and once the receiver has been either manually or automatically turned on, the receiver must be manually reset or turned off at the end of the transmission.

Yet another prior control system has utilized a dialing apparatus which sends a sequence of pulses that operate a series of stepping switches in the receiver. Considerable time delay is involved in the selection process and substantial effort is involved on the part of the operator. The equipment in such systems is also bulky and problems are encountered in attempting to install such equipment in the limited space available in most mobile installations.

An important object of the invention is to provide an improved receiver of the type set forth including an improved monitor circuit.

Further features of the invention pertain to the construction of the monitor circuit and its connections in a communication receiver. The invention, both as to its organization and method of operation together with further objects and advantages thereof will best be understood by reference to the following specification taken in connection with the accompanying drawings, in which.

Figure 1:
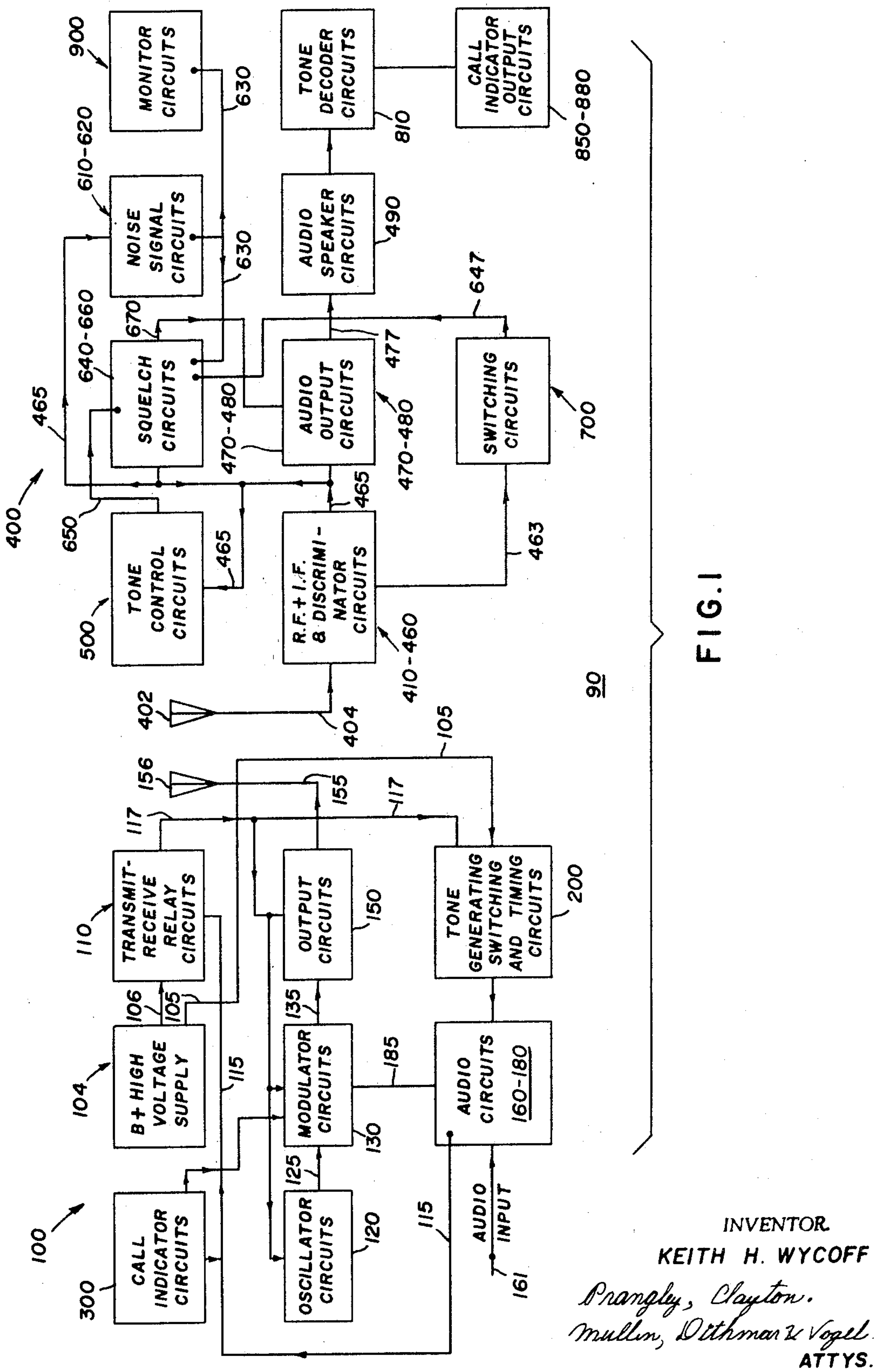
FIG. 1 is a schematic diagram of a communication system, the transmitter and the receiver embodying the system being illustrated in block form.

As has been explained heretofore, the principles of the present invention are equally applicable to communication systems utilizing wire lines, modulated supersonic signals, AM radio signals, and FM radio signals. For the purposes illustrated, there is shown in the drawings a communication system employing FM radio signals. Those skilled in the art will readily understand that the various principles to be described hereafter in conjunction with the system employing FM radio signals can be readily adapted to the other types of communication systems using other forms of transmission set forth above.

Referring to FIG. 1 of the drawings there is shown a mobile FM radio communication system made in accordance with and embodying the principles of the present invention, the system being generally designated by the numeral 90. The system 90 includes an FM transmitter 100 and an FM receiver 400, it being understood that the transmitter 100 and/or the receiver 400 may be either fixed or mobile, each operating station typically containing both a transmitter 100 and a receiver 400.

The transmitter 100 includes a B+ high-voltage supply 104, the output of which is applied through a transmit-receive relay circuit 110 to the other components of the transmitter via a conductor 117. The usual oscillator circuits 120 are provided, the output of which is applied via the conductor 125 to the usual modulator circuits 130 which in turn have the output thereof connected by a conductor 135 to output circuits 150, the output circuits 150 being connected by a conductor 155 to a transmitting antenna 156. Intelligence is impressed upon the transmission by the audio circuits 160–180 which have as an input thereto voice signals on a conductor 161 and control tones from a tone generating, switching and timing circuit 200. One output from the audio circuits 160–180 is a control signal on a conductor 115 which is supplied to the transmit-receive relay circuit 110 for applying operating potential via the conductor 117 to the oscillator circuits 120, the modulator circuits 130, the output circuits 150 and the tone generating, switching and timing circuits 200. Another output from the audio circuits 160–180 is applied via the conductor 185 to the modulator circuits 130 to impress intelligence and/or control tones on the transmission from the transmitter 100. There further are provided call indicator circuits 300 which are connected to the transmit-receive relay circuits 110 and the modulator circuits 130.

The transmissions from the transmitter 100 are adapted to be received by the receiver 400 and more particularly by the antenna 402 thereof which is connected by a conductor 404 to the usual RF and IF and detecting or discriminator circuits 410–460. One output from the circuits 410–460 appears on the conductor 463 which applies a DC potential from the discriminator to the switching circuit 700 which in turn applies a control signal along the conductor 647 to the squelch circuits 640–660. Another signal from the circuits 410–460 is applied by the conductor 465 to the audio output circuits 470–480, to the tone control circuits 500, to the squelch circuits 640–660 and to the noise signal circuits 610–620. The audio output circuits 470–480 in turn have the output thereof connected by a conductor 477, to the audio speaker circuit 490 which provides the usual audio output from the transmitter 400 and in accordance with the present invention also is connected to the tone decoder circuits 810 which in turn are connected to the call indicator output circuits 850–880. The tone control circuits 500 have the output thereof applied by the conductor 650 to the squelch circuits 640–660 and the output of the squelch circuit is in turn applied on the conductor 670 to the audio output circuits 470–480 to control the operation thereof. Another input to the squelch circuit 640–660 is from the noise signal circuits 610–620 via the conductor 630, and another output from the noise signal circuits 610–620 appears on the conductor 630 which is applied to the monitor circuits 900.

Figure 2:
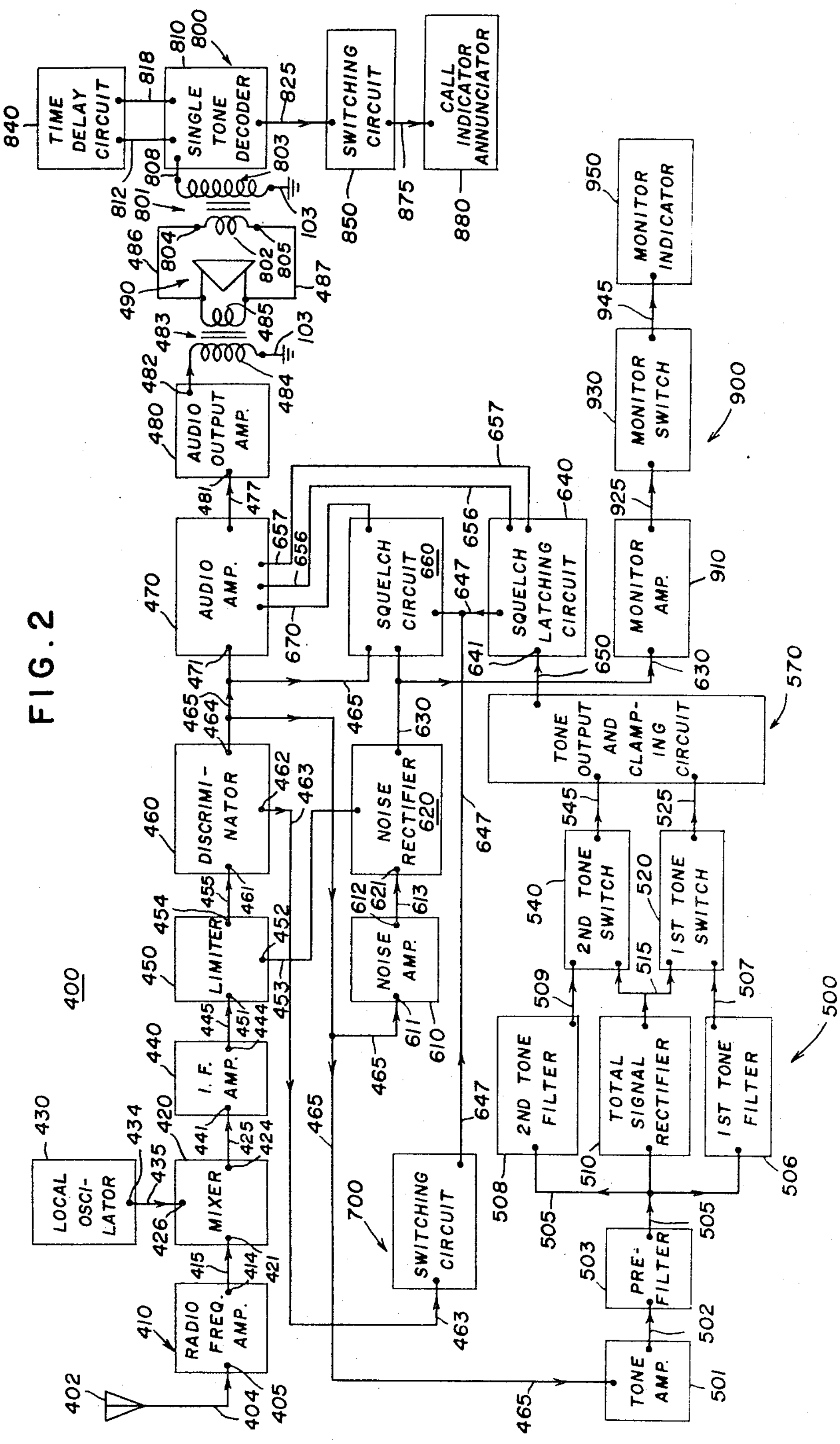
FIG. 2 is a more detailed block diagram of the receiver forming a part of the communication system illustrated in FIG. 1.

There is illustrated in FIG. 2 of the drawings a more complete block diagram of the radio receiver 400 forming a part of the communications system of the present invention. The carrier signal from the transmitter 100 is picked up on the antenna 402 and is conveyed by the conductor 404 to the input terminal 405 of the radiofrequency amplifier 410; the output connection 414 of the amplifier 410 is connected by a conductor 415 to a mixer 420, and particularly to the input terminal 421 therefor; also connected to the mixer 420 is the output from a local oscillator 430 having an output terminal 434 connected by a conductor 435 to a second input terminal 426 for the mixer 420. The resultant IF signal appears at the output 424 of the mixer 420 and is conducted via the conductor 425 to the IF amplifier 440, and particularly the input terminal 441 thereof. The amplified signal appearing at the output terminal 444 of the amplifier 440 is conveyed via a conductor 445 to the input of a limiter 450 and particularly to the input terminal 451 thereof. A first output from the limiter appears on the terminal 454 and is connected by the conductor 455 as an input to the discriminator 460, the conductor 455 being connected to the input terminal 461, and an AC audio output from the discriminator 460 appears at the output terminal 464 that is connected to a conductor 465. The audio signal on the conductor 465 is applied to the audio amplifier 470 and particularly the input terminal 471 thereof, and provided that the tone control circuits to be described hereinafter have operated properly, an output from the audio amplifier 470 appears on a conductor 477 connected to the input terminal 481 of an audio output amplifier 480. The usual output transformer 483 is provided having a primary winding 484 of which one terminal is connected to the output terminal 482 of the amplifier 480 and the other terminal of which is grounded as at 103. The transformer 483 is also provided with a secondary winding 485 which has the terminals thereof connected to conductors 486 and 487 which are connected to a speaker 490 of conventional construction. It will be appreciated that the above describes a typical FM radio receiver of essentially conventional construction.

In accordance with the present invention, circuits are provided to block the output of the audio amplifier 470 until the desired control tone or series of control tones have been received by the receiver 400. To this end a tone control circuit generally designated by the numeral 500 has been provided and includes a tone amplifier 501 having the input thereof connected to the conductor 465 which carries the AC audio output from the discriminator 460. The output of the tone amplifier 501 is connected by the conductor 502 as an input to a prefilter 503 having characteristics such that it will pass all tones in a series of tones designed to actuate the receiver 400. The output of the prefilter 503 is applied by a conductor 505 as an input to a first tone filter 506 adapted to pass the first tone of the sequence of control tones and reject all the other signals, a second tone filter 508 adapted to pass only the second tone in a series of control tones and to reject all the other signals, and a total signal rectifier 510. The output of the first tone filter 506 appearing on the conductor 507 and the output of the total signal rectifier 510 appearing on a conductor 515 are applied as to inputs to a first tone switch 520 having the output thereof appearing on a conductor 525 and utilized as one input to a tone output and clamping circuit 570. The output of the second tone filter 508 appearing on the conductor 509 and the output from the total signal rectifier 510 appearing on the conductor 515 are applied as the inputs to a second tone switch 540 having an output thereof on a conductor 545 applied as a second input to the tone output and clamping circuit 570. The output from the circuit 570 is a control signal appearing on a conductor 650 connected to an input terminal 641 in a squelch latching circuit 640, the circuit 640 also being connected by a pair of conductors 656 and 657 to proper points in the audio amplifier 470, as will be described more fully hereinafter. The output of the squelch latching circuit 640 is applied to a conductor 647 as one input to a squelch circuit 660, the output of the squelch circuit 660 being connected by the conductor 670 to the audio amplifier 470.

Another input to the squelch circuit 660 is derived from the conductor 465 which carries the AC audio output from the discriminator 460. Yet another input to the squelch circuit 660 is derived from the noise circuit including a noise amplifier 610 and a noise rectifier 620. The input to the noise amplifier 610 is derived from the conductor 465 and is applied to the input terminal 611 and the output from the amplifier 610 appears on an output terminal 612 which is connected by a conductor 613 to the input terminal 621 of the noise rectifier 620. The output from the noise rectifier 620 appears on the conductor 630 and is another control input to the squelch circuit 660. Another output from the noise rectifier 620 is fed to the limiter 450 and particularly a second output terminal 452 thereof which is connected to the noise rectifier 620 by a conductor 453. Yet another input to the squelch circuit 660 is derived from a switching circuit 700 which has as an input thereto a DC potential derived from the discriminator 460 and obtained from an output terminal 462 thereof and connected to the switching circuit 700 by a conductor 463. The output from the switching circuit 470 is connected to the conductor 647 and is utilized as one of the inputs to the squelch circuits 660. As illustrated, the squelch circuit 660 is operative to render the audio amplifier 470 blocked until the proper concurrence of a signal from the tone control circuit 500 via the squelch latching circuit 640, a signal from the noise rectifier 620 and a signal from the switching circuit 700.

The receiver 400 of FIG. 2 is also provided with a paging alarm circuit which is connected to the secondary winding 485 of the audio output transformer 483, there being provided an isolating transformer 801 having a primary winding 802 provided with input terminals 804 and 805 connected to the conductors 486 and 487, respectively, and an output winding 803 having one terminal grounded as at 103 and having the other terminal connected by a conductor 808 as an input to a single tone decoder 810. The paging alarm tone is operative when applied to the conductor 810 to provide an output therefrom after the operation of a time delay circuit 840 which is connected to the decoder 810 by the conductors 812 and 818. An output from the decoder 810 appears on a conductor 825 connecting to a switching circuit 850 which when actuated provides a signal on the conductor 875 to operate a paging annunciator 880 such as the lights or the horn of an automotive vehicle.

There further is provided in the receiver 400 a monitor so that the user will have an indication that the channel to which the receiver is tuned is in use without operating switches or other equipment. The monitor circuit is generally designated by the numeral 900 and is connected to the conductor 630 which carries the output from the noise rectifier 620, the conductor 630 being connected as an input to a monitor amplifier 910, the output of the amplifier 910 being connected via a conductor 925 as an input to a monitor switch 930, the output of which in turn is connected by a conductor 945 as an input to a monitor indicator 950.

Figure 3:
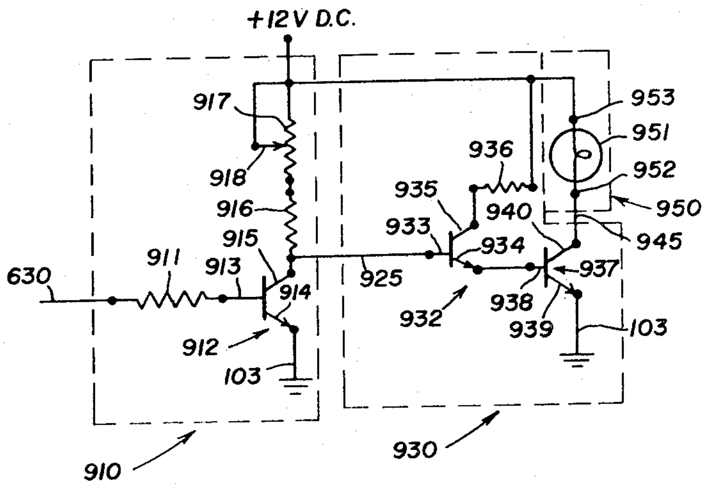
FIG. 3 is a schematic electrical diagram of the monitoring circuit made in accordance with and embodying the principles of the present invention.

The details of construction of the monitoring circuit 900 are illustrated in FIG. 3 of the drawings, wherein it will be seen that the conductor 630 from the noise rectifier 620 (see FIG. 2 also) is connected as the input to the monitor amplifier 910 and particularly to one terminal of an input resistor 911 which has the other terminal thereof connected to an amplifying transistor 912 of the NPN-type, and specifically the base 913 thereof. The emitter 914 of the transistor 912 is connected to the grounded conductor 103, and the collector 915 is connected by the conductor 925 to one terminal of a resistor 916 having the other terminal thereof connected to one terminal of a rheostat 917, the rheostat 917 having a movable contact 918 thereon which connects to the other terminal thereof and is also connected to a source of operating potential (for example + 12 volts DC.

The output from the monitor amplifier 910 appears on the conductor 925 and is applied as an input to the monitor switch 930, and specifically to a transistor 932 of the NPN-type, and particularly to the base 933 thereof. The collector 935 of the transistor 932 is connected through a limiting resistor 936 to the source of operating potential, and the emitter 934 is connected to a transistor 937 of the NPN-type, and particularly to the base 938 thereof. The emitter 939 of the transistor 937 is connected to the grounded conductor 103, and the collector 940 is connected by the conductor 945 to the monitor indicator 950. As illustrated in FIG. 3 the monitor indicator 950 is a lamp bulb 951 having one terminal 952 thereof connected to the conductor 945 and having the other terminal 953 connected to the source of operating potential.

When the receiver 400 does not have applied thereto the carrier signal of the frequency to which the receiver 400 is tuned, the noise rectifier 620 (see FIG. 2) provides on the conductor 630 a substantial potential which causes heavy conduction of the transistor 912, and accordingly the bias on the conductor 925 is relatively low and the transistor 937 appears as an open circuit to the light bulb 951, thus preventing operation thereof. Upon the receipt by the receiver 400 of a carrier signal to which the receiver 400 is tuned, the noise rectifier 620 operates and the potential on the conductor 630 substantially decreases, and accordingly, there is less conduction of the transistor 912, thus increasing the potential on the conductor 925. Increasing the potential on the conductor 925 permits the transistor 937 to conduct and the current therefrom flows through the lamp 951 causing operation thereof. Operation of the lamp 951 tells the operator of the receiver 400 that the broadcasting channel assigned thereto is in use and therefore the operator will not attempt to operate his transmitter so long as the light 950 is operating, thus permitting the operator to monitor his assigned frequency channel continuously and without effort. The rheostat 917 provides for a control of the sensitivity of the monitoring system 900 by adjusting the level of the potential on the conductor 925.

In a typical example of the monitoring system 900, the various components thereof have the following values: the resistor 911, 3.9 megohms; the resistor 916, 100,000 ohms; the resistive element in the rheostat 917 2 megohms; the resistor 936 1,000 ohms.

Although there has been illustrated and described a certain preferred embodiment of the invention, it is to be understood that various changes and modifications can be made therein without departing from the spirit and scope of the invention, and it is intended that all such changes and modifications be covered as fall within the scope of the appended claims.

What is claimed is:

1. A receiver for responding to a fixed frequency carrier wave modulated by at least one control tone and by audio signals, said receiver comprising an input circuit for selectively receiving a carrier wave having the fixed frequency, a detector circuit coupled to said input circuit for detecting the audio signals and the control tone, an audio amplifier circuit coupled to said detector circuit for amplifying the audio signals therefrom, a speaker coupled to said audio amplifier circuit for converting the audio signals into sound waves, a squelch circuit having an input coupled to said detector circuit and an output coupled to said audio amplifier circuit and being operative in a first condition thereof to render said audio amplifier circuit inoperative and operative in a second condition thereof to render said audio amplifier circuit operative, a tone control circuit having an input coupled to said detector circuit and having an output coupled to said squelch circuit, said tone control circuit being responsive to the presence of the control tone for actuating said squelch circuit from the first condition thereof to the second condition thereof to render said audio amplifier circuit operative, a monitor input circuit having an input coupled to said detector circuit and having an output, said monitor input circuit providing at the output thereof a first control signal of a first value when a carrier wave having the fixed frequency is applied to the receiver and a second control signal of a second value in the absence of a carrier wave having the fixed frequency, a monitor switch having an input coupled to the output of said monitor input circuit and having a first condition when said first control signal is applied thereto and having a second condition when said second control signal is applied thereto, and a monitor indicator coupled in a circuit with said monitor switch and being placed in a first condition when said monitor switch is in the first condition thereof and being placed in a second condition when said monitor switch is in the second condition thereof, whereby when said monitor indicator is in said first condition thereof an operator of the receiver is apprised that the channel represented by a carrier wave of the fixed frequency is already being used and is apprised when said monitor indicator is in the second condition thereof that said channel is not being used.

2. The receiver set forth in claim 1, wherein said monitor indicator is a lamp.

3. The receiver set forth in claim 1, wherein said monitor switch is closed in said first condition thereof and is opened in the second condition thereof.

4. The receiver set forth in claim 1, wherein said monitor indicator is a lamp coupled in series with said monitor switch, said monitor switch being closed in the first condition thereof to illuminate said lamp and being opened in the second condition thereof to extinguish said lamp.

* * * * *